(12) United States Patent
Han et al.

(10) Patent No.: US 11,870,077 B2
(45) Date of Patent: Jan. 9, 2024

(54) BINDER COMPOSITION FOR SECONDARY BATTERY ELECTRODE AND ELECTRODE MIXTURE

(71) Applicant: LG Chem, Ltd., Seoul (KR)

(72) Inventors: Jung Sup Han, Daejeon (KR); Dong Jo Ryu, Daejeon (KR); Seon Hee Han, Daejeon (KR); Jeong Man Son, Daejeon (KR); Min Ah Kang, Daejeon (KR); Cheolhoon Choi, Daejeon (KR)

(73) Assignee: LG Chem, Ltd.

( * ) Notice: Subject to any disclaimer, the term of this patent is extended or adjusted under 35 U.S.C. 154(b) by 792 days.

(21) Appl. No.: 16/967,031

(22) PCT Filed: Nov. 1, 2019

(86) PCT No.: PCT/KR2019/014713
§ 371 (c)(1),
(2) Date: Aug. 3, 2020

(87) PCT Pub. No.: WO2020/105902
PCT Pub. Date: May 28, 2020

(65) Prior Publication Data
US 2021/0036326 A1 Feb. 4, 2021

(30) Foreign Application Priority Data

Nov. 20, 2018 (KR) .................. 10-2018-0143834
Oct. 31, 2019 (KR) .................. 10-2019-0137546

(51) Int. Cl.
*H01M 4/62* (2006.01)
*C08F 236/10* (2006.01)
*C08K 3/04* (2006.01)

(52) U.S. Cl.
CPC .......... *H01M 4/622* (2013.01); *C08F 236/10* (2013.01); *C08K 3/04* (2013.01)

(58) Field of Classification Search
CPC ......... C08K 3/04; C08F 236/10; H01M 4/622
See application file for complete search history.

(56) References Cited

U.S. PATENT DOCUMENTS

| 2002/0013405 A1 | 1/2002 | Sakaguchi et al. |
| 2015/0166803 A1* | 6/2015 | Jhaveri et al. |
| 2016/0248095 A1* | 8/2016 | Kurata et al. |

FOREIGN PATENT DOCUMENTS

| CN | 105378989 A | | 3/2016 |
| CN | 107459602 A | | 12/2017 |
| DE | 19749643 A1 | | 5/1999 |
| EP | 2812407 B1 | | 8/2019 |
| JP | H09512578 | * | 12/1997 |
| JP | 2002003778 A | | 1/2002 |
| KR | 950009732 B1 | | 8/1995 |
| KR | 20120100167 A | | 9/2012 |
| KR | 101431876 B1 | | 8/2014 |
| KR | 20150016578 | * | 2/2015 |
| KR | 20150016578 A | | 2/2015 |
| KR | 20150033008 A | | 4/2015 |
| KR | 20150033596 A | | 4/2015 |
| KR | 20160033692 | * | 3/2016 |
| KR | 20160033692 A | | 3/2016 |
| KR | 20160064025 A | | 6/2016 |
| WO | 2017056466 A1 | | 4/2017 |

OTHER PUBLICATIONS

KR 20150016578MT (Year: 2015).*
KR 20160033692 MT (Year: 2016).*
JP H09512578 MT (Year: 1997).*
Xie et all. Ionics 2015,21, 909_915 (Year: 2015).*
Extended European Search Report including Written Opinion for Application No. EP19886633.7 dated Feb. 5, 2021, 9 pgs.
Search Report dated Oct. 11, 2022 from the Office Action for Chinese Application No. 201980011841.3 dated Oct. 18, 2022, pp. 1-2.
International Search Report for Application No. PCT/KR2019/014713 dated Feb. 20, 2020, 2 pages.
Zhang, et al., "The Diacetone Acrylamide Crosslinking Reaction and Its Control of Core-Shell Polyacrylate Latices at Ambient Temperature," Journal of Applied Polymer Science, Feb. 5, 2012, pp. 1822-1832, vol. 23, No. 3.

* cited by examiner

*Primary Examiner* — Alexander Usyatinsky
(74) *Attorney, Agent, or Firm* — Lerner David LLP

(57) ABSTRACT

Provided are a binder composition for a secondary battery and an electrode mixture including the same. More particularly, provided are a binder composition for a secondary battery, the binder composition having excellent characteristics of binding strength, mechanical properties, etc., while maintaining structural stability of an electrode even after repeated charge/discharge cycles, thereby improving performances of a secondary battery, and an electrode mixture including the same.

13 Claims, No Drawings

BINDER COMPOSITION FOR SECONDARY BATTERY ELECTRODE AND ELECTRODE MIXTURE

CROSS-REFERENCE TO RELATED APPLICATION

This application is a national phase entry under 35 U.S.C. § 371 of International Application No. PCT/KR2019/014713, filed Nov. 1, 2019, which claims priority to, Korean Patent Application Nos. 10-2018-0143834 and 10-2019-0137546, filed on Nov. 20, 2018 and Oct. 31, 2019, the disclosures of which are hereby incorporated by reference.

TECHNICAL FIELD

The present invention relates to a binder composition for a secondary battery, and an electrode mixture including the same.

BACKGROUND ART

A rapid increase in the use of fossil fuels has led to an increase in the demand for the use of alternative energy or clean energy. As a part of such demand, most actively investigated fields are fields of secondary batteries based on electrochemistry.

In recent years, increased technological development and demand for mobile equipment such as a portable computer, a mobile phone, a camera, etc. have led to a rapid increase in the demand for secondary batteries as an energy source. Among these secondary batteries, lithium secondary batteries having high energy density and operational voltage, long cycle life and low self-discharge ratio are extensively studied, commercially available and widely used.

In addition, increased concern over environmental issues has brought about a great deal of research associated with electric vehicles and hybrid electric vehicles as substitutes for fossil fuel engines, which are a major cause of air pollution, and lithium secondary batteries are being used as a power source of the electric vehicles, hybrid electric vehicles, etc.

Generally, in the lithium secondary battery, a lithium transition metal oxide is used as a positive electrode active material, and a graphite-based material is used as a negative electrode active material. An electrode of the lithium secondary battery is manufactured by mixing the active material with a binder component, dispersing this mixture in a solvent to prepare a slurry, and then applying the slurry on the surface of a current collector to form a mixture layer.

In general, lithium secondary batteries are charged and discharged through a process in which lithium ions of a positive electrode are repeatedly intercalated and deintercalated at a negative electrode. During this repeated process, a bond between electrode active materials or conductive materials becomes loose and contact resistance between particles increases. As a result, ohmic resistance of an electrode may increase.

Accordingly, since a binder used in the electrode is required to perform buffering action for expansion and contraction of the electrode active material due to intercalation and deintercalation of lithium ions in the electrode while maintaining excellent bonding strength between the electrode active material and the current collector.

Recently, a natural graphite having a theoretical discharge capacity of 372 mAh/g is frequently used with a material having high discharge capacity such as silicon, tin, or silicon-tin alloy, in order to increase discharge capacity of the electrode. Accordingly, volume expansion of the material remarkably increases as charge and discharge proceed, leading to desorption of a negative electrode material. As a result, there are problems in that battery capacity is dramatically decreased and lifespan is shortened.

Further, lithium ion batteries may undergo a swelling phenomenon, in which they swell due to gas generated by decomposition of an electrolyte inside the batteries. The decomposition of the electrolyte is promoted, when the temperature of batteries is elevated with the use of electronic products. As a result, the swelling phenomenon is accelerated, which may cause a reduction in stability of the batteries.

Accordingly, there is an urgent need to study a binder and an electrode material which may have excellent bonding strength so as to prevent separation between electrode active materials or separation between an electrode active material and a current collector while maintaining structural stability of the electrode even after repeated charge/discharge cycles.

DISCLOSURE

Technical Problem

The present disclosure provides a binder composition for a secondary battery, the binding composition having excellent properties such as bonding strength, mechanical properties, etc. while maintaining structural stability of an electrode even after repeated charge/discharge cycles, and a method of preparing the same.

Further, the present disclosure provides a secondary battery electrode mixture including the binder composition for a secondary battery.

Further, the present disclosure provides a secondary battery electrode including the secondary battery electrode mixture.

Further, the present disclosure provides a secondary battery including the secondary battery electrode.

Technical Solution

According to an aspect of the present invention, provided is a binder composition for a secondary battery electrode, the binder composition including a copolymer including:
  a) a first repeating unit derived from a conjugated diene-based monomer;
  b) second repeating units derived from one or more monomers selected from the group consisting of b1) an aromatic vinyl-based monomer and b2) an unsaturated carboxylic acid-based monomer;
  c) a third repeating unit including a crosslinked structure of diacetone acrylamide and adipic acid dihydrazide;
  wherein the diacetone acrylamide is used in an amount of 0.1 part by weight to 3 parts by weight with respect to total 100 parts by weight of the conjugated diene-based monomer, and one or more monomers selected from the group consisting of the aromatic vinyl-based monomer and the unsaturated carboxylic acid-based monomer, and
  the adipic acid dihydrazide is used in an amount of 0.02 parts by weight to 3 parts by weight with respect to total 100 parts by weight of the conjugated diene-based monomer, and one or more monomers selected from the group consisting of the aromatic vinyl-based monomer and the unsaturated carboxylic acid-based monomer.

In this regard, the conjugated diene-based monomer may include 1,3-butadiene.

Further, the aromatic vinyl-based monomer may be one or more selected from the group consisting of styrene, α-methylstyrene, β-methylstyrene, p-t-butylstyrene, chlorostyrene, vinyl benzoic acid, methyl vinyl benzoic acid, vinyl naphthalene, chloromethyl styrene, hydroxymethyl styrene, and divinyl benzene.

Further, the unsaturated carboxylic acid monomer may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

Further, the binder composition for a secondary battery electrode may further include an aqueous solvent.

According to another aspect of the present invention, provided is a method of preparing the binder composition for a secondary battery electrode, the method including:

1) a first step of adding the conjugated diene-based monomer, one or more monomers selected from the group consisting of b1) the aromatic vinyl-based monomer and the unsaturated carboxylic acid-based monomer, and diacetone acrylamide to a solution including an aqueous solvent, an emulsifier, and a polymerization initiator to allow polymerization; and 2) a second step of adjusting the polymerization resultant of the first step at pH of 7 to 8, and then adding adipic acid dihydrazide thereto, followed by mixing.

The first step may include a step of performing primary crosslinking of the monomers by emulsion polymerization at a temperature of 0° C. to 100° C. for 0.5 hr to 20 hr.

The second step may include a step of performing secondary crosslinking by mixing at a temperature of 0° C. to 50° C. for 10 min to 3 hr.

Meanwhile, according to still another aspect of the present invention, provided is a secondary battery electrode mixture including the above-described binder composition for a secondary battery electrode and an electrode active material.

In this regard, the secondary battery electrode mixture may further include a conductive material.

Meanwhile, according to still another aspect of the present invention, provided is a secondary battery electrode including an electrode mixture layer including the secondary battery electrode mixture; and an electrode current collector.

Further, according to still another aspect of the present invention, provided is a secondary battery including the secondary battery electrode.

In the present invention, the terms "first", "second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics, numbers, steps, components, or combinations thereof, and do not exclude the existence or the possibility of addition of one or more different characteristics, numbers, steps, components, or combinations thereof beforehand.

In the present invention, when a layer or an element is mentioned to be formed "on" or "above" layers or elements, it means that each layer or element is directly formed on the layers or elements, or other layers or elements may be formed between the layers, subjects, or substrates.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present invention will be described in detail.

According to an aspect of the present invention, provided is a binder composition for a secondary battery electrode, the binder composition including a copolymer including:

a) a first repeating unit derived from a conjugated diene-based monomer;

b) second repeating units derived from one or more monomers selected from the group consisting of b1) an aromatic vinyl-based monomer and b2) an unsaturated carboxylic acid-based monomer;

c) a third repeating unit including a crosslinked structure of diacetone acrylamide and adipic acid dihydrazide;

wherein the diacetone acrylamide is used in an amount of 0.1 part by weight to 3 parts by weight with respect to total 100 parts by weight of the conjugated diene-based monomer, and one or more monomers selected from the group consisting of the aromatic vinyl-based monomer and the unsaturated carboxylic acid-based monomer, and the adipic acid dihydrazide is used in an amount of 0.02 parts by weight to 3 parts by weight with respect to total 100 parts by weight of the conjugated diene-based monomer, and one or more monomers selected from the group consisting of the aromatic vinyl-based monomer and the unsaturated carboxylic acid-based monomer.

The present inventors have studied to prevent a migration problem during a crosslinking reaction of the existing binder composition for a secondary battery electrode, the binder composition including an emulsion of latex particles prepared by emulsion polymerization of a conjugated diene-based monomer and/or an acrylate-based monomer, etc. As a result, the present inventor found that when two or more kinds of specific materials are used during polymerization of the monomers to provide the binder composition, the migration may be prevented by a crosslinking reaction upon drying after coating the binder composition on a current collector. Therefore, the binder composition of the present invention may exhibit great improvement in a bonding strength, in particular, in a bonding strength at a wet state, thereby achieving stable bonding between the electrode active materials or between the electrode active material and the current collector. Therefore, a cycle capacity retention ratio may be remarkably increased.

Preferably, when the binder composition of the present invention is used, a lithium secondary battery may exhibit excellent $30^{th}$ cycle and $100^{th}$ cycle capacity retention ratios. According to one embodiment of the present invention, the lithium secondary battery may exhibit a $100^{th}$ cycle capacity retention ratio of 70% or more. According to another embodiment of the present invention, the lithium secondary battery may exhibit a $30^{th}$ cycle capacity retention ratio of 70% or more or 73% or more.

The $100^{th}$ cycle capacity retention ratio is a capacity retention ratio measured after repeating charging and discharging of a coin-type lithium secondary battery 100 times at 0.1 C in a voltage range of 0 V to 1 V. Further, the 30$^{th}$ cycle capacity retention ratio is a capacity retention ratio measured after repeating charging and discharging of the coin-type lithium secondary battery 30 times at 0.1 C in a voltage range of 0 V to 1 V.

Such a binder composition for a secondary battery electrode according to one embodiment of the present invention is characterized by including copolymer particles, i.e., latex particles including diacetone acrylamide and adipic acid dihydrazide capable of increasing crosslinkability, in polymerization, preferably, emulsion polymerization of specific repeating units. Therefore, according to the method of the present invention, a cumbersome process of introducing an additional external crosslinking agent may be reduced. Further, the copolymer may include repeating units derived from respective monomers.

Hereinafter, a binder composition for a secondary battery electrode according to one embodiment of the present invention and a method of preparing the same will be described in more detail.

Latex Particle

The binder composition for a secondary battery according to one embodiment of the present invention is a copolymer including emulsion polymer particles of specific monomers, i.e., latex particles. In each latex particle, each monomer may exist in the form of a repeating unit derived from the monomer. Further, the latex particles may refer to aliphatic conjugated diene-based latex particles having a gel content of about 90% by weight or more. More preferably, the latex particles may have a gel content of 90% by weight to 100% by weight.

Further, the latex particles (copolymer) according to the present invention may be prepared by emulsion polymerization, and may have a weight average molecular weight of 10,000 to 1,000,000. Since the latex particles may have the weight average molecular weight of the above-described range as well as the above-described crosslinked structure, structural stability of the electrode may be maintained even after repeated charge/discharge cycles, contributing to improvement of battery performance. In this regard, the weight average molecular weight is a value determined by gel permeation chromatography (GPC) using polystyrene standards. More specifically, the weight average molecular weight means a weight average molecular weight (unit: g/mol) in terms of polystyrene, determined by GPC method. In the process of determining the weight average molecular weight in terms of the polystyrene by the GPC method, a commonly known analysis device, a detector such as a refractive index detector, etc., and an analytical column may be used, and temperature conditions, solvents, and flow rates commonly applied may be applied.

Such a latex particle may be prepared through emulsion polymerization, in which the above-mentioned diacetone acrylamide and adipic acid dihydrazide are used in predetermined amounts without using a molecular weight modifier and a reaction regulator, thereby having a relatively high gel content. Therefore, according to the present invention, a capacity retention ratio of a coated electrode after charge/discharge cycles may be improved at the time of manufacturing a secondary battery.

In the emulsion polymerization for preparing the latex particles, a conjugated diene-based monomer may be used, and therefore, the latex particles include a repeating unit derived from the conjugated diene-based monomer, i.e., a first repeating unit.

Representative examples of the conjugated diene-based monomer may be one or more selected from the group consisting of 1,3-butadiene, isoprene, chloroprene, and piperylene, preferably 1,3-butadiene.

In the emulsion polymerization for preparing the latex particles, one or more monomers selected from the group consisting of b) b1) an aromatic vinyl-based monomer and b2) an unsaturated carboxylic acid-based monomer may be further used, in addition to the conjugated diene-based monomer, and therefore, the latex particles include repeating units derived from the above-described monomers, i.e., second repeating units. Preferably, the second repeating unit may include repeating units derived from the aromatic vinyl-based monomer and the unsaturated carboxylic acid-based monomer.

The aromatic vinyl-based monomer may be one or more monomers selected from the group consisting of styrene, α-methylstyrene, β-methylstyrene, p-t-butylstyrene, chlorostyrene, vinyl benzoic acid, methyl vinyl benzoic acid, vinyl naphthalene, chloromethyl styrene, hydroxymethyl styrene, and divinyl benzene, and preferably styrene.

When the conjugated diene-based monomer is included as a component of the latex particles, a binder prepared therefrom may suppress a swelling phenomenon of an electrolyte liquid at a high temperature and may have elasticity due to the rubber ingredient, and thus function to reduce thickness of the electrode and gas generation and to improve adhesive strength so as to maintain bonding strength between the electrode active material and the current collector.

Further, the unsaturated carboxylic acid-based monomer may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid. Preferably, the unsaturated carboxylic acid-based monomer may be acrylic acid.

The copolymer including the above-described first repeating unit and second repeating unit may include 10% by weight to 70% by weight of the first repeating unit and 30% by weight to 90% by weight of the second repeating unit, based on the total weight of the first repeating unit and the second repeating unit, indicating that a molar ratio of the first repeating unit and the second repeating unit is 5:1 to 1:5. The content of each repeating unit may be controlled by controlling the content of each monomer during a polymerization process described below.

The emulsion polymerization for preparing the latex particles is characterized by using c) diacetone acrylamide and adipic acid dihydrazide. Therefore, the latex particles may include a third repeating unit which is bound to the first repeating unit and the second repeating unit derived from the above-described monomers by forming a crosslinked structure.

The diacetone acrylamide may provide the copolymer with a functional group capable of reacting with adipic acid dihydrazide for the formation of the final crosslinked structure. Further, the adipic acid dihydrazide is mixed with the copolymer including diacetone acrylamide, thereby exhibiting the effect of further enhancing crosslinkability of the first crosslinked copolymer particles.

Specifically, according to the present invention, two components which may function as an external crosslinking agent may be used.

In the first step, a primary crosslinked copolymer is formed by internal crosslinking through polymerization of the monomer including the first repeating unit, and at this time, the diacetone acrylamide provides the copolymer with a reaction site for the secondary crosslinking.

Further, in the second step, when adipic acid dihydrazide is mixed and dried, it forms the secondary crosslinking with the above reaction site, thereby providing final copolymer particles capable of improving long-term cycle characteristics by improvement of an adhesive strength for drying and an electrolyte liquid. In other words, in the second step, the primary crosslinked (internal crosslinked) copolymer formed in the first step forms the secondary crosslinking (external crosslinking) by the above two components, thereby improving crosslinkability of the copolymer. Therefore, the crosslinking of diacetone acrylamide and adipic acid dihydrazide used in the present invention may refer to external crosslinking indicating the crosslinking between the primary crosslinked polymers.

Accordingly, the present invention may prevent migration through the crosslinking reaction between dispersed particles during drying owing to use of the above two materials, thereby providing a binder including the copolymer having a strong adhesive strength with respect to the current collector due to a strong bond between the polymers different from each other.

Accordingly, the diacetone acrylamide and dihydrazide enable dispersion of the copolymer particles (i.e., latex particles) having enhanced crosslinkability throughout the electrode, thereby improving the cycle capacity retention ratio. Thus, the present invention may improve the bonding strength between the binder and the current collector, in particular, may maintain the excellent adhesive strength even at a wet state.

Further, the copolymer latex particles prepared by emulsion polymerization of the above-descried monomers in combination may have a reduced degree of swelling in an electrolyte liquid and an enhanced bonding strength with respect to the current collector, thereby improving lifespan characteristics of electrodes. The binder composition including such latex particles may improve overall performances of a lithium secondary battery.

The diacetone acrylamide may be used in an amount of 0.1 part by weight to 3 parts by weight, preferably about 1 part by weight to 3 parts by weight with respect to total 100 parts by weight of the conjugated diene-based monomer and one or more monomers selected from the group consisting of the aromatic vinyl-based monomer and the unsaturated carboxylic acid-based monomer. If the above-described diacetone acrylamide is included in an amount excessively smaller than the above range, it is difficult to provide the primary crosslinked copolymer with the functional group capable of reacting with the adipic acid dihydrazide. If the amount is excessively large, excessive bonding between internal molecules may reduce the adhesion to the current collector.

The adipic acid dihydrazide may be used in an amount of 0.02 parts by weight to 3 parts by weight, preferably about 0.05 parts by weight to 1.5 parts by weight with respect to total 100 parts by weight of the conjugated diene-based monomer and one or more monomers selected from the group consisting of the aromatic vinyl-based monomer and the unsaturated carboxylic acid-based monomer. If the above-described adipic acid dihydrazide is included in an amount excessively smaller than the above range, it is difficult to provide improvement of crosslinkability. If the amount is excessively large, excessive bonding between internal molecules may reduce the adhesion to the current collector.

Further, according to one embodiment of the present invention, the binder composition for a secondary battery electrode may further include an aqueous solvent including the emulsion of the latex particles obtained by emulsion polymerization of the monomers.

In this regard, the aqueous solvent may be used in an amount of about 50 parts by weight to about 1,000 parts by weight, preferably about 50 parts by weight to about 200 parts by weight with respect to 100 parts by weight of the copolymer in view of controlling viscosity of the latex particles (copolymer). For example, the aqueous solvent may be used such that a total solid content (TSC) is about 10% to about 60%, based on the total weight of the binder composition.

Further, the copolymer may be in the form of latex particle through the above-described emulsion polymerization. Specifically, the copolymer may be a latex particle having an average particle size of 40 nm to 500 nm. In this regard, the average particle size of the latex particle may be determined by using a particle sizer (NICOMP Corp., AW380).

Emulsion Polymerization

Meanwhile, according to another aspect of the present invention, provided is a method of preparing the above-described binder composition for a secondary battery electrode, the method including:

1) a first step of adding the conjugated diene-based monomer, one or more monomers selected from the group consisting of b1) the aromatic vinyl-based monomer and the unsaturated carboxylic acid-based monomer, and diacetone acrylamide to a solution including an aqueous solvent, an emulsifier, and a polymerization initiator to allow polymerization; and 2) a second step of adjusting the polymerization resultant of the first step at pH of 7 to 8, and then adding adipic acid dihydrazide thereto, followed by mixing.

The copolymer particles, i.e., latex particles, included in the binder composition according to one embodiment of the present invention may be prepared by a generally known emulsion polymerization method, as described above. For example, the emulsion polymerization may be carried out in the presence of an emulsifier and a polymerization initiator in a solution including the above-described aqueous solvent.

However, as described above, the present invention is characterized by using diacetone acrylamide in the first step and adipic acid dihydrazide in the second step. Specifically, in the method of the present invention, diacetone acrylamide is added in the first step to prepare the copolymer, into which a functional group capable of reacting the adipic acid dihydrazide for the formation of the secondary crosslinking structure is introduced, and adipic acid dihydrazide is added in the second step to prepare a final copolymer which may form the secondary crosslinking during drying. Therefore, adhesive strength may be further enhanced, as compared with general binders. Accordingly, the present invention provides optimal crosslinking conditions for the binder composition for a secondary battery electrode, thereby remarkably improving the bonding strength between the electrode active materials or between the electrode active material and the current collector, and improving the charge/discharge efficiency of a battery.

Further, in the method of preparing the binder composition for a secondary battery electrode by emulsion polymerization of the present invention, a mercaptan-based molecular weight modifier, such as dodecyl mercaptan, is not used. As in the present invention, when the molecular weight modifier is not used, latex particles to be prepared may have a relatively high gel content, as compared with those prepared by using the molecular weight modifier, and a battery may maintain excellent overall performances even after repeated charge/discharge.

In the first step, the conjugated diene-based monomer may be used in an amount of 10% by weight to 70% by weight, based on the total weight of the monomers. Further, one or more monomers selected from the group consisting of the aromatic vinyl-based monomer and the unsaturated carboxylic acid-based monomer may be used in an amount of 30% by weight to 90% by weight, based on the total weight of the monomers.

As described above, the diacetone acrylamide may be used in an amount of 0.1 part by weight to 3 parts by weight, based on the total 100 parts by weight of the conjugated diene-based monomer and one or more monomers selected from the group consisting of the aromatic vinyl-based monomer and the unsaturated carboxylic acid-based monomer.

The adipic acid dihydrazide may be used in an amount of 0.02 parts by weight to 3 parts by weight, based on the total 100 parts by weight of the conjugated diene-based monomer and one or more monomers selected from the group consisting of the aromatic vinyl-based monomer and the unsaturated carboxylic acid-based monomer.

Further, if the above-described diacetone acrylamide is included in an amount excessively smaller than the above range, there are problems in that it is difficult to prevent migration due to insufficient crosslinking, and it is difficult to exhibit a strong adhesive strength with respect to the current collector due to a weak bond between the polymers different from each other. If the diacetone acrylamide is included in an amount excessively larger than the above range, there are problems in that excessive crosslinking may occur between the polymers different from each other, and thus it is difficult to exhibit a strong adhesive strength with respect to the current collector.

Further, if the above-described adipic acid dihydrazide is included in an amount excessively smaller than the above range, there are also problems in that it is difficult to prevent migration due to insufficient crosslinking, and it is difficult to exhibit a strong adhesive strength with respect to the current collector due to a weak bond between the polymers different from each other. If the adipic acid dihydrazide is included in an amount excessively larger than the above range, there are also problems in that excessive crosslinking may occur between the polymers different from each other, and rather, it is difficult to exhibit a strong adhesive strength with respect to the current collector.

In the first step, the polymerization temperature and the polymerization time may be appropriately determined according to circumstances. For example, the first step may include a step of performing primary crosslinking of the monomers by emulsion polymerization at a temperature of 0° C. to 100° C. for 0.5 hr to 20 hr.

A polymerization initiator applicable in the emulsion polymerization may include inorganic or organic peroxides. For example, water-soluble initiators including potassium persulfate, sodium persulfate, ammonium persulfate, etc., and oil-soluble initiators including cumene hydroperoxide, benzoyl peroxide, etc. may be used.

In addition, an activator to promote the reaction initiation of peroxide may be further included, together with the polymerization initiator, and the activator may include one or more selected from the group consisting of sodium formaldehyde sulfoxylate, sodium ethylenediaminetetraacetate, ferrous sulfate, and dextrose.

For the emulsion polymerization, one or more emulsifiers selected from the group consisting of anionic emulsifiers, cationic emulsifiers, and non-ionic emulsifiers may be further included during polymerization.

Such an emulsifier is a material having a hydrophilic group and a hydrophobic group at the same time. In the emulsion polymerization process, the emulsifier forms a micelle structure and allows polymerization of each monomer within the micelle structure.

Emulsifiers commonly used in the emulsion polymerization may be divided into anionic emulsifiers, cationic emulsifiers, and nonionic emulsifiers, which may be used in combination of two or more thereof in view of polymerization stability in the emulsion polymerization.

Specifically, the anionic emulsifiers may include sodium dodecyl diphenyl ether disulfonate, sodium lauryl sulfate, sodium dodecyl benzene sulfonate, dioctyl sodium sulfosuccinate, etc.

The nonionic emulsifiers may include polyethylene oxide alkyl aryl ether, polyethylene oxide alkyl amine, and polyethylene oxide alkyl ester, and these may be used alone or in combination of two or more thereof. A mixture of the anionic emulsifier and the nonionic emulsifier is more effective, but the present invention is not necessarily limited to these kinds of emulsifiers.

The emulsifier may be used, for example, in an amount of about 0.01 part by weight to about 10 parts by weight, about 1 part by weight to about 10 parts by weight, or about 3 parts by weight to about 5 parts by weight with respect to total 100 parts by weight of the monomer components used in the preparation of the latex particles.

The aqueous solvent may be used in an amount of about 50 parts by weight to about 1,000 parts by weight with respect to 100 parts by weight of the latex particles in view of controlling stability and viscosity of the latex particles. For example, the aqueous solvent may be used such that a total solid content (TSC) is about 10% to about 60%, based on the total weight of the binder composition.

Further, the second step may include the step of performing secondary crosslinking during mixing and drying at a temperature of 0° C. to 50° C. for 10 min to 3 hr.

Meanwhile, according to still another aspect of the present invention, provided is a secondary battery electrode mixture including the above-described binder composition for a secondary battery electrode and an electrode active material.

Further, according to still another aspect of the present invention, provided is a secondary battery electrode including an electrode mixture layer including the secondary battery electrode mixture; and an electrode current collector.

Except for the binder described above, the electrode active material, the electrode current collector, and the like used in the electrode mixture and the electrode of the present invention may include generally known components, respectively.

For example, the electrode mixture may be used in the preparation of a negative electrode. In other words, the electrode mixture may be a negative electrode mixture, and the electrode active material may be a negative electrode active material.

Here, the binder may be included in an amount of 1% by weight to 10% by weight, specifically, 1% by weight to 5% by weight, based on the total weight (100% by weight) of the negative electrode mixture. When satisfying this range, the content of the negative electrode active material may be relatively increased, and discharge capacity of the electrode may be further enhanced.

Meanwhile, since the binder is excellent in the characteristics of binding strength, mechanical properties, etc., the binder may maintain binding strength between the negative electrode active material and the negative electrode active material or between the negative electrode active material and the negative electrode current collector, when a graphite-based negative electrode active material is used as the negative electrode active material of the negative electrode mixture or even when a negative electrode active material having higher capacity than the graphite-based negative electrode active material is used, and the binder may prevent expansion of the negative electrode active material due to its own mechanical property.

As described, the binder is suitable for application not only with the graphite-based negative electrode active material but also with the negative electrode active material with higher capacity than the graphite-based negative electrode active material, and thus the kind of the negative electrode active material is not particularly limited in one embodiment of the present invention.

Specifically, the negative electrode active material may be, for example, carbon and graphite materials such as natural graphite, artificial graphite, carbon fiber, non-graphitizable carbons, etc.; metals alloyable with lithium such as Al, Si, Sn, Ag, Bi, Mg, Zn, In, Ge, Pb, Pd, Pt, Ti, etc., and compounds including these elements; complexes of metals and compounds thereof and complexes of carbon and graphite materials; lithium-containing nitrides; titanium oxide; lithium titanium oxide, etc., but is not limited thereto. Among them, a carbon-based active material, a silicon-based active material, a tin-based active material, or a silicon-carbon-based active material is more preferable, and these may be used alone or in combination of two or more thereof.

The negative electrode current collector is generally fabricated in a thickness of 3 μm to 500 μm. The negative electrode current collector is not particularly limited, as long as it has conductivity without causing chemical changes in a battery. For example, copper, stainless steel, aluminum, nickel, titanium, sintered carbon, and copper or stainless steel having a surface treated with carbon, nickel, titanium, or silver, aluminum-cadmium alloys, etc. may be used. Further, like a positive electrode current collector, the negative electrode current collector may also be processed to form fine irregularities on the surface thereof so as to enhance adhesive strength to the negative electrode active material. The negative electrode current collector may be used in various forms including films, sheets, foils, nets, porous structures, foams, non-woven fabrics, etc.

The negative electrode may be fabricated by applying the electrode mixture including the negative electrode active material and the binder onto the negative electrode current collector, followed by drying and rolling. If necessary, the negative electrode may be fabricated by further adding a conductive material, a filler, etc.

The conductive material is not particularly limited, as long as it has conductivity without causing chemical changes in a battery. Examples thereof may include graphite such as natural graphite, artificial graphite, etc.; carbon black such as carbon black, acetylene black, Ketjen black, channel black, furnace black, lamp black, and thermal black, etc.; conductive fibers such as carbon fibers, metallic fibers, etc.; metallic powders such as carbon fluoride powder, aluminum powder, and nickel powder; conductive whiskers such as zinc oxide, potassium titanate, etc.; conductive metal oxides such as titanium oxide, etc.; conductive materials such as polyphenylene derivatives, etc.

The filler is a component optionally used to inhibit expansion of the negative electrode. The filler is not particularly limited, as long as it is a fibrous material without causing chemical changes in a battery. For example, olefinic polymers such as polyethylene, polypropylene, etc.; and fibrous materials such as glass fibers, carbon fibers, etc. may be used.

Meanwhile, the electrode mixture is not limited to the preparation of the negative electrode, and may be used in the preparation of a positive electrode. In other words, the electrode mixture may be a positive electrode mixture, and the electrode active material may be a positive electrode active material.

The positive electrode active material may include a layered compound such as a lithium cobalt oxide ($LiCoO_2$), lithium nickel oxide ($LiNiO_2$) etc., or a compound substituted with one or more transition metals; lithium manganese oxide such as Chemical formula of $Li_{1+x}Mn_{2-x}O_4$ (wherein x is 0 to 0.33), $LiMnO_3$, $LiMn_2O_3$, $LiMnO_2$, etc.; lithium copper oxide ($Li_2CuO_2$); vanadium oxides such as $LiV_3O_8$, $LiFe_3O_4$, $V_2O_5$, $Cu_2V_2O_7$, etc.; lithium iron phosphate represented by Chemical formula of $Li_{1+a}Fe_{1-x}M_xPO_{4-b}A_b$ (wherein M is one or more selected from the group consisting of Mn, Ni, Co, Cu, Sc, Ti, Cr, V and Zn, and A is one or more selected from the group consisting of S, Se, F, Cl, and I, $-0.5<a<0.5$, $0 \leq x<0.5$, $0 \leq b \leq 0.1$); a Ni site type lithium nickel oxide represented by Chemical formula of $LiNi_{1-x}M_xO_2$ (wherein M=Co, Mn, Al, Cu, Fe, Mg, B or Ga, and x=0.01 to 0.3); a lithium manganese complex oxide represented by Chemical formula of $LiMn_{2-x}M_xO_2$ (wherein M=Co, Ni, Fe, Cr, Zn or Ta, and x=0.01 to 0.1) or $Li_2Mn_3MO_8$ (wherein M=Fe, Co, Ni, Cu, or Zn), lithium manganese complex oxide of a spinel structure, represented by $LiNi_xMn_{2-x}O_4$; lithium-nickel-manganese-cobalt oxide represented by Chemical formula of $Li(Ni_pCo_qMn_{r1})O_2$ (wherein $0<p<1$, $0<q<1$, $0<r1<1$, $p+q+r1=1$), or lithium-nickel-manganese-cobalt oxide represented by Chemical formula of $Li(Ni_{p1}Co_{q1}Mn_{r2})O_4$ (wherein $0<p1<2$, $0<q1<2$, $0<r2<2$, $p1+q1+r2=2$), etc.), or lithium-nickel-cobalt-transition metal (M) oxide represented by $Li(Ni_{p2}Co_{q2}Mn_{r3}M_{s2})O_2$ (wherein M is selected from the group consisting of Al, Fe, V, Cr, Ti, Ta, Mg, and Mo, p2, q2, r3, and s2 each represent atomic fractions of independent elements, and satisfy $0<p2<1$, $0<q2<1$, $0<r3<1$, $0<s2<1$, $p2+q2+r3+s2=1$), etc., but is not limited thereto.

The positive electrode current collector is generally fabricated in a thickness of 3 μm to 500 μm. The positive electrode current collector is not particularly limited, as long as it has high conductivity without causing chemical changes in a battery. For example, stainless steel, aluminum, nickel, titanium, sintered carbon, and aluminum or stainless steel having a surface treated with carbon, nickel, titanium, silver, etc. may be used. The current collector may also be processed to form fine irregularities on the surface thereof so as to enhance adhesive strength to the positive electrode active material. The collector may be used in various forms including films, sheets, foils, nets, porous structures, foams, non-woven fabrics, etc.

Of the negative electrode and the positive electrode, any electrode in which the above-described binder is not used may employ a binder generally known. Representative examples thereof may include polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc., but are not limited thereto.

The negative electrode or the positive electrode may be fabricated by mixing each active material and the binder, optionally, a conductive material, and a filler in a solvent to prepare an electrode mixture in a slurry phase, and applying this electrode mixture onto each electrode current collector. This method of fabricating the electrode is widely known in the art, and a detailed description thereof will be omitted in the present description.

Meanwhile, according to still another aspect of the present invention, provided is a secondary battery including the secondary battery electrode. Such a battery may be specifically in the form of including a positive electrode; an electrolyte; and a negative electrode.

The secondary battery may be embodied in a lithium secondary battery.

The lithium secondary battery may be fabricated by impregnating an electrode assembly including a positive electrode, a separator, and a negative electrode with a non-aqueous electrolytic solution.

The positive electrode and the negative electrode are the same as described above.

The separator may include any materials used in the common lithium battery as long as it separates the negative electrode from the positive electrode and provides a travel path for lithium ions. In other words, the separator may have a low resistance to ion transportation of electrolyte and an excellent impregnation for the electrolytic solution. For example, it may be selected from glass fiber, polyester, Teflon, polyethylene, polypropylene, polytetrafluoroethylene (PTFE), or a combination thereof. It may have a form of a non-woven fabric or a woven fabric. For example, a polyolefin-based polymer separator such as polyethylene, polypropylene, etc. is mainly used for the lithium ion battery. In order to ensure the heat resistance or mechanical strength, a coated separator including a ceramic component or a polymer material may be used. Optionally, it may have a mono-layered or multi-layered structure.

If necessary, the separator may be coated with a gel polymer electrolyte to increase stability of a battery. Representative examples of the gel polymer may include polyethyleneoxide, polyvinylidene fluoride, polyacrylonitrile, etc.

However, when a solid electrolyte, not the non-aqueous electrolyte, is employed, the solid electrolyte may also serve as the separator.

The non-aqueous electrolyte may be a liquid electrolyte including a non-aqueous organic solvent and lithium salt. The non-aqueous organic solvent serves as a medium for transmitting ions involved in the electrochemical reaction of a battery.

The non-aqueous electrolyte may include a non-aqueous electrolytic liquid, an organic solid electrolyte, an inorganic solid electrolyte, etc.

As the non-aqueous electrolyte liquid, for example, an aprotic organic solvent such as N-methyl-2-pyrrolidone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydro furan, 2-methyl tetrahydrofuran, dimethyl sulfoxide, 1,3-dioxolane, 4-methyl-1,3-dioxolane, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propinate, ethyl propionate, and the like may be used.

As the organic solid electrolyte, for example, polyethylene derivatives, polyethylene oxide derivatives, polypropylene oxide derivatives, phosphoric acid ester polymers, poly-agitation lysine, polyester sulfide, polyvinyl alcohols, polyvinylidene fluoride, and polymers containing ionic dissociation groups or the like may be used.

As inorganic solid electrolyte, for example, nitrides, halides and sulfates of lithium such as $Li_3N$, $LiI$, $Li_5NI_2$, $Li_3N$-$LiI$-$LiOH$, $LiSiO_4$, $LiSiO_4$-$LiI$-$LiOH$, $Li_2SiS_3$, $Li_4SiO_4$, $Li_4SiO_4$-$LiI$-$LiOH$, $Li_3PO_4$-$Li_2S$-$SiS_2$ or the like may be used.

The lithium salt is a material that is readily soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate or the like may be used.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolytic liquid. If necessary, in order to impart incombustibility, the electrolytic solution may further include halogen-containing solvents such as carbon tetrachloride, ethylene trifluoride, etc. Further, in order to improve high-temperature storage characteristics, the electrolytic solution may further include carbon dioxide gas, and may further include FEC (fluoroethylene carbonate), PRS (propene sultone), FPC (fluoropropylene carbonate), etc.

The lithium secondary battery according to the present invention may be used in a battery cell used as a power source of small devices and may also be used as a unit battery of a medium-to-large battery module including a plurality of battery cells.

Effect of the Invention

A binder composition for a secondary battery of the present invention has excellent characteristics of binding strength, mechanical properties, etc., and enables uniform dispersion of a binder throughout an electrode to improve a capacity retention ratio even after charge/discharge cycles, thereby maintaining structural stability of the electrode and improving performances of a secondary battery. Particularly, in the present invention, a $100^{th}$ cycle capacity retention ratio in a coated electrode is remarkably improved, as compared with that of the existing.

DETAILED DESCRIPTION OF THE EMBODIMENTS

Hereinafter, the actions and effects of the present invention will be described in more detail with reference to the specific Examples of the present invention. However, these Examples are for illustrative purposes only, and the scope of the present invention is not intended to be limited by these Examples.

EXAMPLE

Example 1

Preparation of Binder
(a) 1,3-butadiene (50 g), (b1) styrene (48 g), (b2) acrylic acid (2 g), and (c) diacetone acrylamide (1 g) as monomers were introduced to a reactor including water containing sodium lauryl sulfate (0.3 g) as an emulsifier and potassium persulfate (0.1 g) as a polymerization initiator, followed by mixing. Thereafter, this mixture was subjected to emulsion polymerization at 70° C. for 5 hours. Next, a sodium hydroxide aqueous solution was introduced to the reactor, and the mixture was adjusted to pH of 7 to 8. Then, (d) adipic acid dihydrazide (0.5 g) was introduced and mixed under stirring at room temperature for 1 hour to prepare a binder composition for a secondary battery.

The binder composition was in the form of emulsion having a solid content (latex particles) of about 40 wt %. A particle size of the obtained latex particles was determined as an average particle size by using a particle sizer (NICOMP Corp., AW380), and the result is shown in Table 1.

Further, a weight average molecular weight of the latex particles was about 30,000 and a gel content thereof was about 98%.

1) The weight average molecular weight value was determined by the following method.

Apparatus: gel permeation chromatography GPC (name of measuring instrument: Alliance e2695; manufacturer: WATERS); Detector: refractive index detector (name of measuring instrument: W2414; manufacturer: WATERS); Column: DMF column; Flow rate: 1 mL/min; Column temperature: 65° C.; feeding volume: 0.100 mL; Samples for standardization: polystyrene, unit (g/mol)

2) The gel content value was determined by the following method.

0.4 g of a dry sample and 40 g of a tetrahydrofuran solvent (THF) were introduced to a 50 ml vial, followed by shaking for 24 hours. The solution was filtered through a #200 mesh (74 μm), and the filtrate was dried and weighed as % by weight with respect to the initial weight of the sample.

Gel content (%)=(weight of filtered sample after drying/initial weight of dry sample)×100

Examples 2 to 5

A binder composition for a secondary battery was prepared in the same manner as in Example 1, except that the contents of diacetone acrylamide and adipic acid dihydrazide were changed as in Table 1. Further, a weight average molecular weight of the latex particles was about 30,000 and a gel content thereof was about 98%.

Comparative Example 1

A binder composition for a secondary battery was prepared in the same manner as in Example 1, except that diacetone acrylamide and adipic acid dihydrazide were not used. Further, a weight average molecular weight of the latex particles was about 30,000 and a gel content thereof was about 98%.

Comparative Example 2

A binder composition for a secondary battery was prepared in the same manner as in Comparative Example 1, except that sodium lauryl sulfate (0.1 g) was introduced as an emulsifier. Further, a weight average molecular weight of the latex particles was about 30,000 and a gel content thereof was about 98%.

Comparative Examples 3 to 4

A binder composition for a secondary battery was prepared in the same manner as in Example 1, except that the contents of diacetone acrylamide and adipic acid dihydrazide were changed as in the following Table 1. Further, a weight average molecular weight of the latex particles was about 30,000 and a gel content thereof was about 98%.

Comparative Example 5

45 g of 1,3-butadiene, 50 g of styrene, 3 g of acrylic acid, and 2 g of hydroxyethyl acrylate as monomers, $NaHCO_3$ (0.4 g) as a buffer, sodium lauryl sulfate (0.4 g), and dodecyl mercaptan (0.5 g) as a molecular weight modifier were introduced into a reactor at the same time.

Thereafter, this mixture was subjected to emulsion polymerization at 70° C. for 5 hours. After heating the resultant to the above temperature, a solution containing potassium persulfate (0.1 g) as a polymerization initiator in water was added thereto. As a result of the polymerization, butadiene latex particles were obtained and adjusted to pH of 7.5. A weight average molecular weight of the latex particles was about 20,000 and a gel content thereof was about 30%.

Comparative Example 6

A binder composition for a secondary battery was prepared in the same manner as in Example 1, except that dodecyl mercaptan (0.5 g) was used as a molecular weight modifier in Example 1. A weight average molecular weight of the latex particles was about 20,000 and a gel content thereof was about 70%.

Comparative Example 7

A binder composition for a secondary battery was prepared in the same manner as in Example 1, except that adipic acid dihydrazide was not introduced after emulsion polymerization. A weight average molecular weight of the latex particles was about 30,000 and a gel content thereof was about 98%.

Comparative Example 8

A binder composition for a secondary battery was prepared in the same manner as in Comparative Example 5, except that the contents of diacetone acrylamide and adipic acid dihydrazide were changed as in the following Table 1. Further, a weight average molecular weight of the latex particles was about 20,000 and a gel content thereof was about 95%.

TABLE 1

|  | Content of DAAM (g) | Content of ADH (g) | Molecular weight modifier (g) | Content ratio (ADH/DAAM) | Particle size (nm) |
|---|---|---|---|---|---|
| Example 1 | 1.0 | 0.5 | | 0.5 | 153 |
| Example 2 | 0.1 | 0.05 | | 0.5 | 155 |
| Example 3 | 3.0 | 1.5 | | 0.5 | 152 |
| Example 4 | 1.0 | 0.2 | | 0.2 | 150 |
| Example 5 | 1.0 | 1.0 | | 1.0 | 152 |
| Comparative Example 1 | — | — | | — | 153 |
| Comparative Example 2 | — | — | | — | 302 |
| Comparative Example 3 | 0.08 | 0.04 | | 0.5 | 155 |
| Comparative Example 4 | 4.0 | 2.0 | | 0.5 | 150 |
| Comparative Example 5 | — | — | 0.5 | — | 153 |
| Comparative Example 6 | 1.0 | 0.5 | 0.5 | 0.5 | 155 |
| Comparative Example 7 | 1.0 | — | | — | 152 |
| Comparative Example 8 | 10.0 | 20.0 | 0.5 | 2.0 | 155 | note)
1) unit of content (parts by weight): feeding amount with respect to 100 g of total monomers used
2) DAAM: diacetone acrylamide, ADH: adipic acid dihydrazide Experimental Example Preparation of Negative Electrode Mixture 85.2 g of artificial graphite, 9.5 g of silicon oxide, 1 g of acetylene black, 7.5 g (solid content of 40%) of the prepared binder, and 86.7 g (solid content of 1.5%) of carboxymethyl cellulose as a thickener, based on 100 g of the total solid content, were mixed in water as a dispersing medium, thereby preparing a slurry for a negative electrode in which the total solid content was 50% by weight.

Fabrication of Negative Electrode

The negative electrode mixture was applied onto a copper foil in a thickness of about 100 μm using a comma coater, and then dried in a dry oven at 80° C., and then roll-pressed to a final thickness of 60 μm, thereby obtaining a negative electrode.

Test of Adhesive Strength at Dry State

The negative electrode plate prepared above was cut to a predetermined size and fixed on a slide glass. The current collector was peeled off, and the peeling strength of 180 degree was measured. The test was repeated five times, and the average value is summarized in Table 2 below.

Test of Adhesive Strength at Wet State

The negative electrode plate prepared above was cut to a predetermined size and impregnated for 24 hours with an electrolyte liquid, in which ethylene carbonate (EC): propylene carbonate (PC): diethyl carbonate (DEC)=3:2:5 (weight ratio) were mixed to be prepared at a wet state. Then, the negative electrode plate was fixed on a slide glass. The current collector was peeled off, and the peeling strength of 180 degree was measured. The test was repeated five times, and the average value is summarized in Table 2 below.

Test of Capacity Retention Ratio

A coin-type lithium secondary battery was fabricated using the electrode and lithium. The manufactured coin-type lithium secondary battery was charged at 0.1 C and discharged at 0.1 C in a voltage range of 0 V to 1 V, and this procedure was repeated 30 times and 100 times. The capacity retention ratios ($30^{th}$ cycle capacity retention ratio and $100^{th}$ cycle capacity retention ratio) were summarized in Table 2 below.

Further, the content (g) of the binder included in the lower portion close to the copper foil was measured with respect to 100 g of the binder included in the entire electrode.

Method of measuring the content of the binder: the binder in the electrode which was formed at a thickness of 70 μm on the copper foil was stained, and then SEM was used to measure and calculate the binder distribution in the electrode. At this time, based on the total thickness of the binder formed on the copper foil, the portions occupying the same thickness were defined as the upper and lower binders, respectively. Of them, the lower binder was defined as the portion faced with the surface of the copper foil.

TABLE 2

|  | Content of binder (lower portion/ entire) | Adhesive strength at dry state (unit: gf/cm) | Adhesive strength at wet state (unit: gf/cm) | $30^{th}$ cycle capacity retention ratio (%) | $100^{th}$ cycle capacity retention ratio (%) |
|---|---|---|---|---|---|
| Example 1 | 57 | 25 | 12 | 75 | 71 |
| Example 2 | 45 | 23 | 11 | 73 | 70 |
| Example 3 | 63 | 21 | 14 | 75 | 72 |
| Example 4 | 50 | 22 | 12 | 73 | 70 |
| Example 5 | 59 | 24 | 12 | 75 | 71 |
| Comparative Example 1 | 25 | 17 | 8 | 63 | 52 |
| Comparative Example 2 | 49 | 23 | 9 | 65 | 55 |
| Comparative Example 3 | 31 | 20 | 9 | 65 | 55 |
| Comparative Example 4 | 72 | 18 | 12 | 68 | 63 |
| Comparative Example 5 | 21 | 18 | 8 | 65 | 55 |
| Comparative Example 6 | 29 | 18 | 9 | 67 | 58 |
| Comparative Example 7 | 25 | 17 | 8 | 62 | 53 |
| Comparative Example 8 | 65 | 19 | 11 | 65 | 63 |

Referring to the results of Table 2, Examples 1 to 5 showed excellent adhesive strength at a dry state as well as at a wet state in the electrolyte liquid, as compared with Comparative Examples 1 to 8. In addition, Examples 1 to 5 according to the present invention showed improved $30^{th}$ cycle capacity retention ratio and $100^{th}$ cycle capacity retention ratio of 70% or more, as compared with Comparative Examples 1 to 4. These results confirmed that since the binder of the present invention was uniformly distributed throughout the electrode, its adhesive strength in the electrolyte liquid was improved, and thus the capacity retention ratio of the battery was not decreased but improved even after repeated charge/discharge cycles.

In contrast, Comparative Examples 1 to 8 showed overall poor adhesive strength and cycle capacity retention ratio, and in particular, showed lowered $100^{th}$ cycle capacity retention ratio. In this regard, Comparative Example 4 showed the adhesive strength in the electrolyte liquid, similar to those of Examples, but its $30^{th}$ cycle capacity retention ratio and $100^{th}$ cycle capacity retention ratio were lower than those of Examples.

The invention claimed is:

1. A binder composition for a secondary battery electrode, the binder composition comprising a copolymer consisting of the following repeating units:
   a) a first repeating unit derived from a conjugated diene-based monomer;
   b) second repeating units derived from b1) an aromatic vinyl-based monomer and b2) an unsaturated carboxylic acid-based monomer;
   c) a third repeating unit consisting of a crosslinked structure of diacetone acrylamide and adipic acid dihydrazide;
   wherein the diacetone acrylamide is included in an amount of 0.1 part by weight to 3 parts by weight with respect to total 100 parts by weight of the conjugated diene-based monomer, the aromatic vinyl-based monomer, and the unsaturated carboxylic acid-based monomer, and
   the adipic acid dihydrazide is included in an amount of 0.02 parts by weight to 3 parts by weight with respect to total 100 parts by weight of the conjugated diene-based monomer, the aromatic vinyl-based monomer, and the unsaturated carboxylic acid-based monomer.

2. The binder composition for a secondary battery electrode of claim 1, wherein the conjugated diene-based monomer includes 1,3-butadiene.

3. The binder composition for a secondary battery electrode of claim 1, wherein the aromatic vinyl-based monomer is one or more selected from the group consisting of styrene, α-methylstyrene, β-methylstyrene, p-t-butylstyrene, chlorostyrene, vinyl benzoic acid, methyl vinyl benzoic acid, vinyl naphthalene, chloromethyl styrene, hydroxymethyl styrene, and divinyl benzene.

4. The binder composition for a secondary battery electrode of claim 1, wherein the unsaturated carboxylic acid based monomer is one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

5. The binder composition for a secondary battery electrode of claim 1, further comprising an aqueous solvent.

6. The binder composition for a secondary battery electrode of claim 5, wherein the aqueous solvent is included in an amount of 50 parts by weight to 1,000 parts by weight with respect to 100 parts by weight of the copolymer.

7. The binder composition for a secondary battery electrode of claim 1, wherein the copolymer includes latex particles having a weight average molecular weight of 10,000 to 1,000,000.

8. A method of preparing a binder composition for a secondary battery electrode, comprising:
   1) A first step of adding a conjugated diene-based monomer, one or more monomers selected from the group consisting of b1) an aromatic vinyl-based monomer and an unsaturated carboxylic acid-based monomer, and diacetone acrylamide to a solution including an aqueous solvent, an emulsifier, and a polymerization initiator to allow polymerization to form a polymerization resultant; and
   2) A second step of adjusting a pH of the polymerization resultant at pH of 7 to 8, and then adding adipic acid dihydrazide thereto, followed by mixing,
   wherein the second step includes performing secondary crosslinking by mixing and drying at a temperature of 0° C. to 50° C. for 10 min to 3 hr, and
   wherein the binder composition comprises a copolymer including:
   a) a first repeating unit derived from the conjugated diene-based monomer;
   b) second repeating units derived from one or more monomers selected from the group consisting of b1) the aromatic vinyl-based monomer and b2) the unsaturated carboxylic acid-based monomer;
   c) a third repeating unit including a crosslinked structure of the diacetone acrylamide and the adipic acid dihydrazide;
   wherein the diacetone acrylamide is included in an amount of 0.1 part by weight to 3 parts by weight with respect to total 100 parts by weight of the conjugated diene-based monomer, and one or more monomers selected from the group consisting of the aromatic vinyl-based monomer and the unsaturated carboxylic acid-based monomer, and
   wherein the adipic acid dihydrazide is included in an amount of 0.02 parts by weight to 3 parts by weight with respect to total 100 parts by weight of the conjugated diene-based monomer, and one or more monomers selected from the group consisting of the aromatic vinyl-based monomer and the unsaturated carboxylic acid-based monomer.

9. The method of claim 8, wherein the first step includes performing primary crosslinking of the monomers by emulsion polymerization at a temperature of 0° C. to 100° C. for 0.5 hr to 20 hr.

10. A secondary battery electrode mixture comprising the binder composition for a secondary battery electrode of claim 1 and an electrode active material.

11. The secondary battery electrode mixture of claim 10, further comprising a conductive material.

12. A secondary battery electrode comprising an electrode mixture layer including the secondary battery electrode mixture of claim 10; and an electrode current collector.

13. A secondary battery comprising the secondary battery electrode of claim 12.

* * * * *